United States Patent
Hong et al.

(10) Patent No.: US 8,347,488 B2
(45) Date of Patent: *Jan. 8, 2013

(54) MAGNETIC WRITE HEAD MANUFACTURED BY DAMASCENE PROCESS PRODUCING A TAPERED WRITE POLE WITH A NON-MAGNETIC STEP AND NON-MAGNETIC BUMP

(75) Inventors: Liubo Hong, San Jose, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 525 days.

This patent is subject to a terminal disclaimer.

(21) Appl. No.: 12/634,490

(22) Filed: Dec. 9, 2009

(65) Prior Publication Data

US 2011/0132869 A1 Jun. 9, 2011

(51) Int. Cl.
- *G11S 5/127* (2006.01)
- *H04R 31/00* (2006.01)

(52) U.S. Cl. ............ 29/603.16; 29/603.12; 29/603.13; 29/603.14; 29/603.15; 29/603.18; 216/22; 216/39; 216/41; 216/48; 216/65; 360/121; 360/122; 360/317; 451/5; 451/41

(58) Field of Classification Search .. 29/603.13–603.16, 29/603.18; 216/22, 39, 41, 48, 65; 306/121, 306/122, 317; 451/5, 41; 360/121, 122, 360/317

See application file for complete search history.

(56) References Cited

U.S. PATENT DOCUMENTS

| | | | |
|---|---|---|---|
| 5,075,956 A | 12/1991 | Das | 29/603 |
| 6,738,233 B2 | 5/2004 | Khizroev et al. | 360/319 |
| 6,954,340 B2 | 10/2005 | Shukh et al. | 360/317 |
| 7,071,009 B2 * | 7/2006 | Wang et al. | 438/3 |
| 7,140,095 B2 | 11/2006 | Matono | 29/603.15 |
| 7,159,302 B2 | 1/2007 | Feldbaum et al. | 29/603.12 |
| 7,212,379 B2 | 5/2007 | Hsu et al. | 360/126 |
| 7,233,457 B2 | 6/2007 | Johnston et al. | 360/125 |
| 7,305,753 B2 | 12/2007 | Kobayashi | 29/603.16 |
| 7,343,668 B2 | 3/2008 | Kobayashi | 29/603.16 |
| 7,365,942 B2 | 4/2008 | Sasaki et al. | 360/126 |

(Continued)

FOREIGN PATENT DOCUMENTS

JP 3209609 9/1991

(Continued)

OTHER PUBLICATIONS

U.S. Appl. No. 12/641,242, filed Dec. 17, 2009.

(Continued)

*Primary Examiner* — Paul D Kim
(74) *Attorney, Agent, or Firm* — Zilka-Kotab, PC

(57) ABSTRACT

A method for manufacturing a magnetic write head having a non-magnetic step layer, non-magnetic bump at the front of the non-magnetic step layer and a write pole with a tapered trailing edge. The tapered portion of the trailing edge of the write pole is formed by a two step process that allows the write pole taper to be formed with greater accuracy and repeatability than would be possible using a single step taper process. An alternative method is also described on how to make a non-magnetic bump structure with adjustable bump throat height prior to Damascene side shield gap formation in a Damascene wrap around shield head.

23 Claims, 32 Drawing Sheets

U.S. PATENT DOCUMENTS

| | | | |
|---|---|---|---|
| 7,377,024 B2 | 5/2008 | Chen | 29/603.13 |
| 7,443,633 B2 | 10/2008 | Tagami et al. | 360/125.5 |
| 7,463,450 B2 | 12/2008 | Sasaki et al. | 360/125.24 |
| 8,000,059 B2 * | 8/2011 | Jiang et al. | 360/125.3 |
| 2005/0219743 A1 | 10/2005 | Guan et al. | 360/125 |
| 2006/0245108 A1 | 11/2006 | Hsu et al. | 360/125 |
| 2007/0035885 A1 | 2/2007 | Im et al. | 360/317 |
| 2008/0024911 A1 | 1/2008 | Sasaki et al. | 360/110 |
| 2008/0112081 A1 | 5/2008 | Matono | 360/125.08 |
| 2008/0112088 A1 | 5/2008 | Hsiao et al. | 360/319 |
| 2008/0151437 A1 | 6/2008 | Chen et al. | 360/319 |
| 2008/0170334 A1 | 7/2008 | Otagiri | 360/313 |
| 2008/0259498 A1 | 10/2008 | Lengsfield et al. | 360/235.4 |
| 2008/0297953 A1 | 12/2008 | Matono et al. | 360/319 |
| 2008/0316653 A1 | 12/2008 | Sasaki et al. | 360/319 |
| 2009/0059426 A1 | 3/2009 | Sasaki et al. | 360/125.02 |
| 2009/0067098 A1 | 3/2009 | Kim et al. | 360/313 |
| 2009/0122445 A1 | 5/2009 | Jiang et al. | 360/123.12 |
| 2009/0141406 A1 | 6/2009 | Sasaki et al. | 360/319 |
| 2009/0154009 A1 | 6/2009 | Le | 360/110 |
| 2009/0154019 A1 | 6/2009 | Hsiao et al. | 360/234.3 |

FOREIGN PATENT DOCUMENTS

| | | |
|---|---|---|
| JP | 2007257711 | 10/2007 |
| JP | 2008217846 | 9/2008 |
| JP | 2009009632 | 1/2009 |
| JP | 2009/048719 | 3/2009 |

OTHER PUBLICATIONS

Restriction Requirement from U.S. Appl. No. 12/641,242 dated Dec. 1, 2011.

Notice of Allowance and Fee(s) Due from U.S. Appl. No. 12/641,242 dated Mar. 1, 2012.

* cited by examiner

MAGNETIC WRITE HEAD MANUFACTURED BY DAMASCENE PROCESS PRODUCING A TAPERED WRITE POLE WITH A NON-MAGNETIC STEP AND NON-MAGNETIC BUMP

FIELD OF THE INVENTION

The present invention relates to magnetic heads for data recording, and more particularly to a method for manufacturing a perpendicular magnetic write head having a tapered write pole and a non-magnetic bump for optimal trailing shield spacing.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded. It is desirable to maximize both of these parameters, while also ensuring that the magnetic write pole does not become magnetically saturated at the pole tip.

SUMMARY OF THE INVENTION

The present invention provides a method for manufacturing a magnetic write head having a tapered write pole trailing edge, a non-magnetic step layer, and a non-magnetic bump structure for optimal trailing shield magnetic spacing. The method includes, first forming a magnetic write pole, then depositing a non-magnetic step layer over the write pole, the non-magnetic step layer having a front edge located a desired distance from an intended air bearing surface plane. A first ion milling is performed to form a first tapered portion on the write pole, and then a non-magnetic gap material is deposited A second ion milling is then performed to preferentially remove horizontally disposed portions of the non-magnetic gap material, leaving a non-magnetic bump over the front edge of the non-magnetic step layer. Then, a third ion milling is performed to form a second tapered portion on the write pole.

The two step process for forming the trailing edge taper allows for improved control of the location of the front edge of the non-magnetic bump structure. This is because the location of the front edge of the bump is determined by the location at which the first tapered portion of the write pole terminates. Then, after forming the bump (with its well defined front edge), the rest of the trailing edge taper can be formed.

The write pole can be formed by a damascene process wherein an opening is formed in a sacrificial RIEable fill layer. A non-magnetic track width reducing layer such as Ru can be deposited into the opening to reduce the width of the opening, and a magnetic material such as NiFe can be electroplated into the opening.

According to one method the fill layer can be removed after the trailing edge taper, step layer and non-magnetic bump have been formed. However, in another embodiment of the invention, the fill layer can be removed after the formation of the trailing edge taper, step layer and non-magnetic bump.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
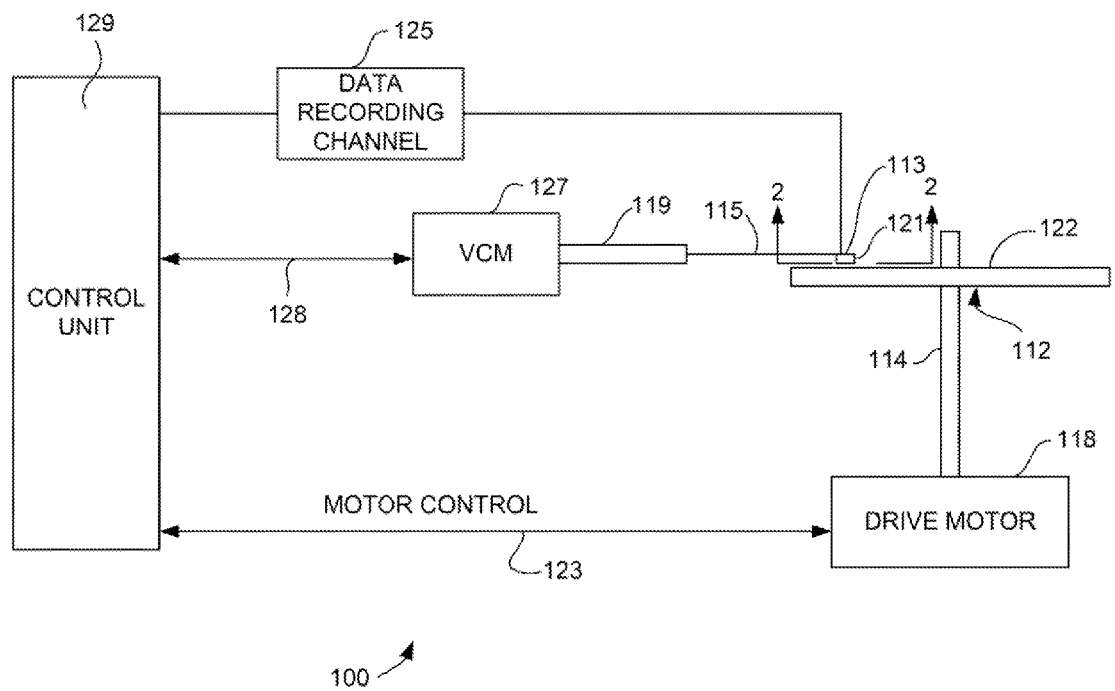
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
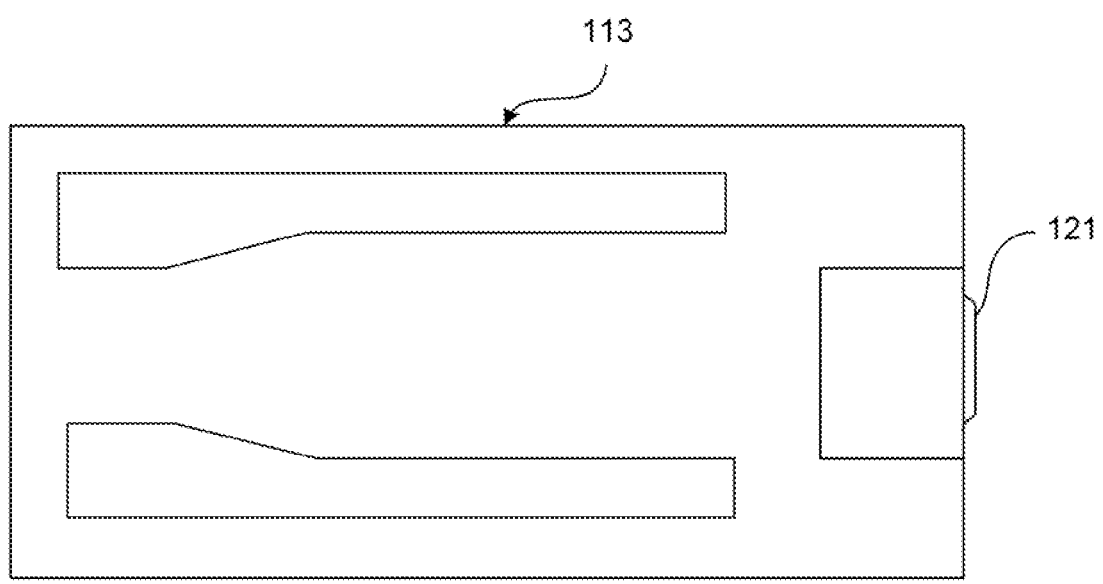
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
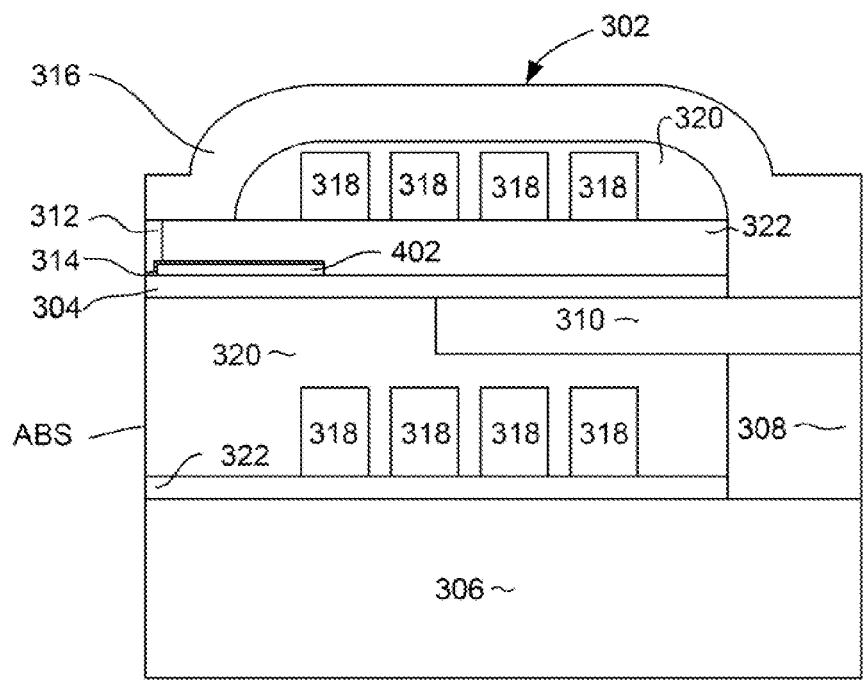
FIG. 3 is a cross sectional view of a magnetic write head according to an embodiment of the present invention.

With reference now to FIG. 3, the invention can be embodied in a magnetic head 302 having a tapered write pole and a non-magnetic bump. The write head 302 includes a magnetic write pole 304, and a magnetic return pole 306, both of which extend to an air bearing surface (ABS). A magnetic back gap layer 308 can be magnetically connected with the return pole 306 in a region removed from the ABS. However, the magnetic back gap 308 is optional. A magnetic shaping layer 310 can be connected with the back gap layer 308 and also with the write pole 304.

In order to increase field gradient to increase the speed with which magnetization of the write field can be switched, a trailing magnetic shield 312 is provided at the ABS, adjacent to the trailing edge of the write pole. The trailing shield 312 is separated from the write pole 304 by a non-magnetic trailing gap layer 314. A trailing return pole 316 can be provided to conduct magnetic flux from the trailing shield 312 to the shaping layer 310 and back gap 308.

A non-magnetic, electrically conductive write coil 318 passes above and below the write pole 304 and shaping layer 310. The write coil 318 (shown partially and in cross section in FIG. 3) can be constructed of a material such as Cu, and when an electrical current flows through the write coil 318, a resulting magnetic field causes a magnetic flux to flow through the return pole 306, back gap 308 and write pole 304. The write coil 318 can be encased within a non-magnetic, electrically insulating fill layer 320, such as alumina and or hard baked photoresist, and can be formed on a non-magnetic, electrically insulating under-layer 322, which also can be a material such as alumina.

Figure 4:
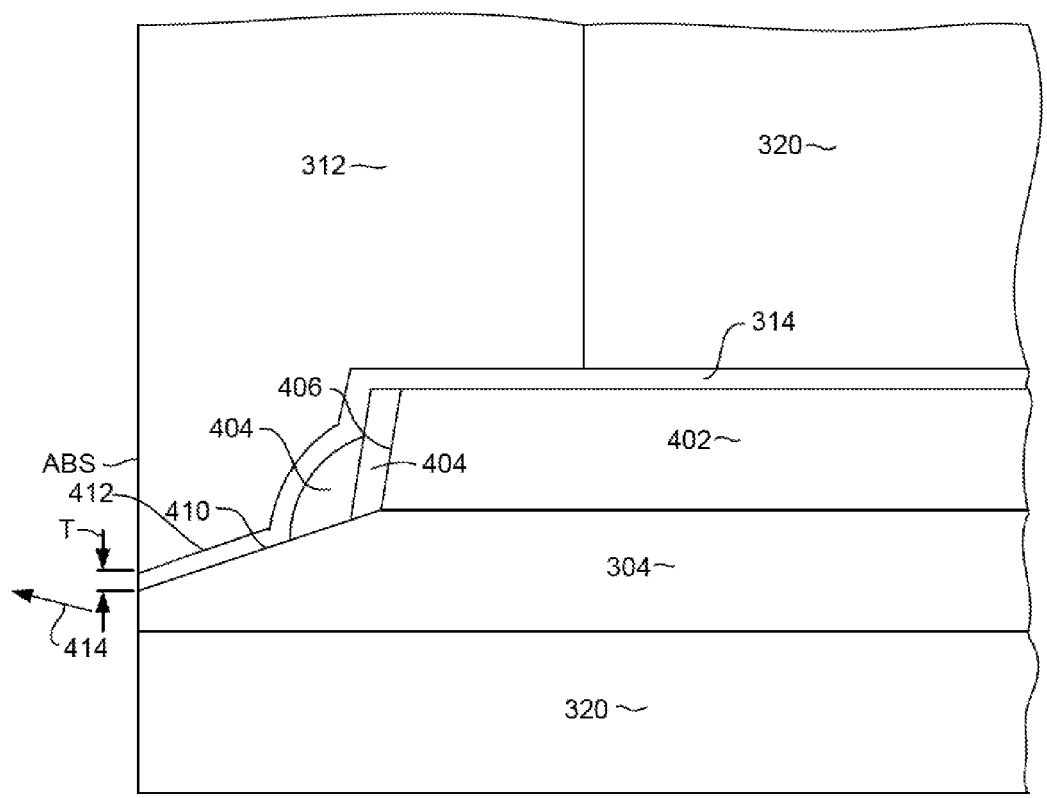
FIG. 4 is an enlarged view of a pole tip region of the magnetic recording head of FIG. 3.

The pole tip region of the write pole 314 can be seen more clearly with reference to FIG. 4, which shows an enlarged view of the pole tip portion of the write pole 304 and surrounding structure. A non-magnetic step layer 402 is formed over the write pole 304, and can be constructed primarily of non-magnetic materials such as NiCr or Cr. This non-magnetic step layer 402 is also a trailing edge taper mask, as will become clearer below, and may include a hard mask layer such as SiC or diamond like carbon (DLC) which will be discussed in greater detail below.

The non-magnetic step layer 402 has a front edge 406, at an end closest to the ABS that may be slightly tapered backward relative to the ABS. A non-magnetic bump layer 404 is formed at the front edge 406 of the magnetic step layer 402. The front edge 406 is recessed from the ABS by a desired amount. The desired dimension of the front edge recess (distance between the ABS and the front edge 406) is between 100-250 nm. The distance between the front edge of non-magnetic bump 404 to ABS is about 50-150 nm. The flare point of the write pole is about 50-120 nm.

As can be seen, the write pole 304 has a tapered or sloped trailing edge having a taper portion 410 between the nonmagnetic step and the ABS. As can be seen, the trailing edge taper 410 terminates at the front edge 406 of the non-magnetic step layer 402. This is a result of manufacturing processes that will be described further below.

The presence of the non-magnetic step layer 402 helps to reduce magnetic flux loss between the pole tip portion of the write pole 304 and the trailing shield 312. The tapered trailing edge portion, 412 further promotes the focusing of magnetic flux to the pole tip while avoiding magnetic saturation of the pole tip portion of the write pole 304.

The trailing magnetic shield 312 helps to increase the field gradient of the magnetic write field 414 emitted from the tip of the write pole 304. This increase in field gradient helps to define a shaper written transition, thereby improving signal-to-noise ratio and increasing data density.

Optimal functioning of the trailing shield involves a tradeoff between maximizing field gradient improvements and minimizing the loss of write field to the trailing shield. The write head is preferably designed so as to prevent magnetic saturation of the trailing shield 312. In addition, the spacing between the write pole 402 and the trailing shield 312 is preferably such that the write field is maximized at the tip of the write pole 402, and also such that little write field leaks from the write pole 402 to the trailing shield 312.

The present invention optimizes both of these goals. The write gap 314 has a thickness "T" that provides a desired spacing between the write pole 304 and the trailing shield 312 at the pole tip. This spacing T can therefore be controlled by controlling the as deposited thickness of the trailing gap layer 314.

The location of the front edge 406 of the magnetic step layer 402, as well as the initiation point of the steep tapered trailing edge portion 410 of the write pole 304, are critical regions for the leakage of flux from the write pole 304 to the trailing shield. This is because of the sudden channeling of magnetic flux from the write pole 304 into a much smaller pole tip portion of the write pole 304. In order to prevent the leakage of magnetic flux at this point, the non-magnetic bump 404 and the non-magnetic step 402 advantageously increases the magnetic spacing between the trailing shield 312 and the write pole 304. As can be seen, the spacing between the write pole 304 and the trailing shield 312 at this point is the sum of the thickness of the bump 404 and the thickness of the gap layer 314 in the region immediately in front of the step 402, and the spacing is the sum of the step 402 and the thickness of the gap layer 314 behind the step 402. The non-magnetic bump 404 can be constructed of a material such as alumina and can be formed by a manufacturing process that will be described in greater detail herein below.

Figure 5:
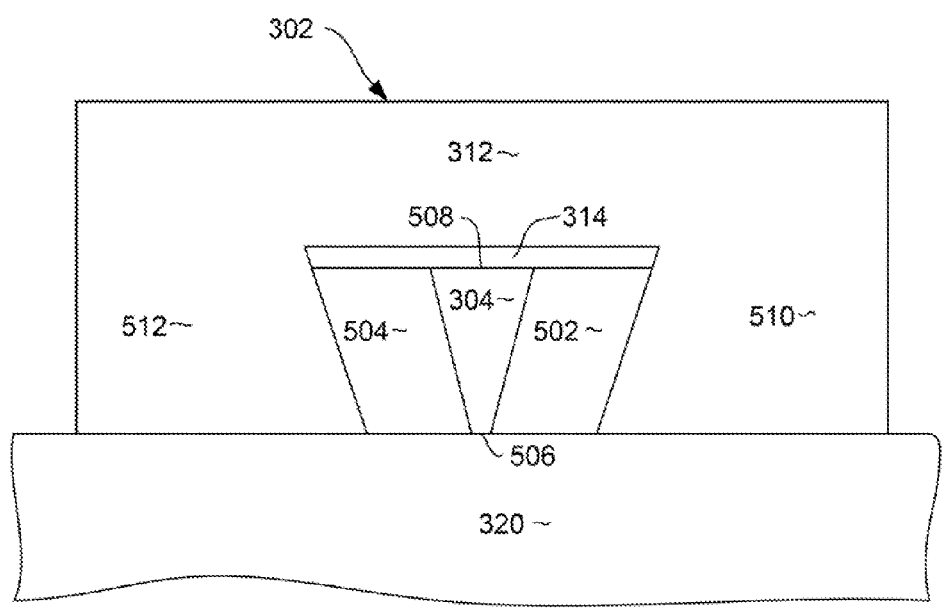
FIG. 5 is an ABS view of the magnetic recording head of FIGS. 3 and 4.

FIG. 5 shows an enlarged view of a portion of the write head 302 as viewed from the air bearing surface ABS. As can be seen, the write pole 304 as viewed from the ABS has a narrow, trapezoidal shape. In fact, the tip of the write pole 304 is so narrow that is nearly resembles a triangular shape, having a leading edge 506 that is extremely small (smaller than the trailing edge 508), the leading edge 506 of the write pole 304 defining the track width of the write pole 304. Also as can be seen in FIG. 5, the trailing shield 312 is actually a wrap-around trailing shield, having side portions 510, 512 that extend down the sides of the write pole 304. The side portions 510, 512 of the shield 312 are separated from the write pole 304 by first and second side gap layers 502, 504 that can be constructed of a non-magnetic material such as alumina. The construction of the write pole 304, side gaps 502, 504, trailing gap 314 and shield 312 will be described in greater detail below.

Figure 6:
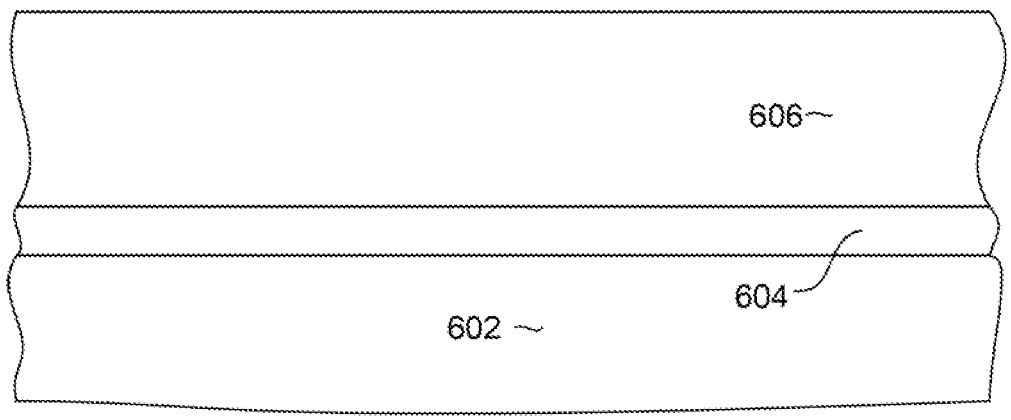
FIGS. 6-25, are views of a portion of a magnetic write head in various intermediate stages of manufacture, illustrating a method for manufacturing a magnetic write head according to an embodiment of the invention.

FIGS. 6-25 illustrate a method for manufacturing, a magnetic write head according to an embodiment of the invention. With reference to FIG. 6, a substrate 602 is provided. This substrate 602 can include the insulating fill layer 320 and shaping layer 310 of FIG. 3. A layer of material that is resistant to reactive ion etching (RIE stop layer) 604 is deposited over the substrate 602. The RIE stop layer can be a material such as Cr, NiCr, Ru, etc. Then, a non-magnetic RIEable material 606 such as $SiO_2$ or alumina ($Al_2O_3$) is deposited over the RIE stop layer. The RIEable fill layer is deposited to a sufficient thickness to form a write pole therein, as will become apparent below.

Figure 7:
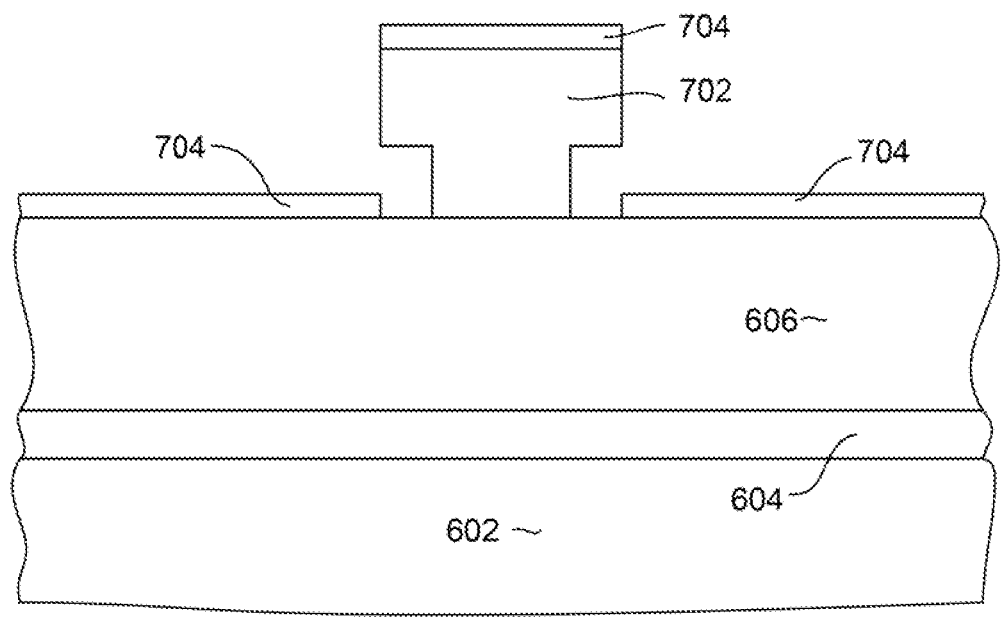

With reference now to FIG. 7, a bi-layer photoresist mask structure 702 is formed over the RIEable fill layer 606. The mask 702 is configured to define a write pole shape, as will become apparent below. Then, a RIE hard mask layer 704 is deposited over the fill layer 606 and mask 702. The hard mask layer 704 can include one or more of, Ta, Cr, NiCr, etc.

Figure 8:
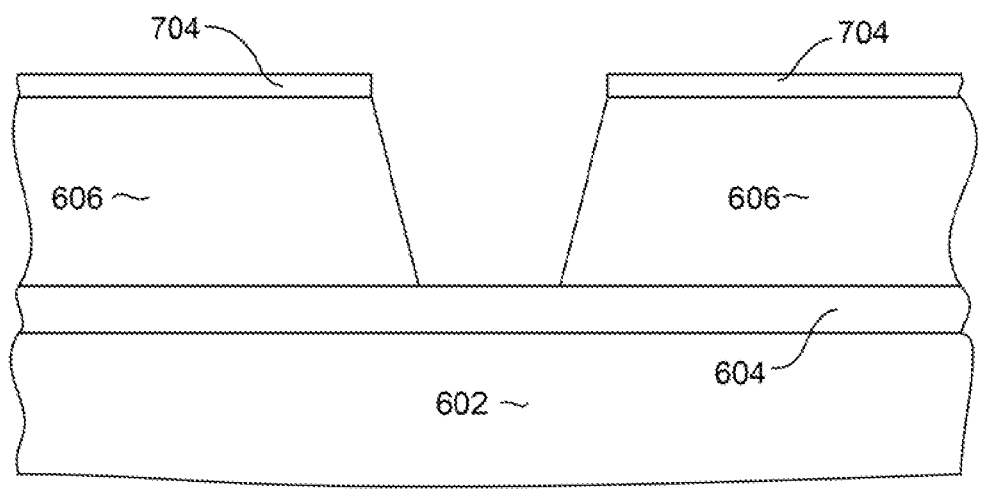
Figure 9:
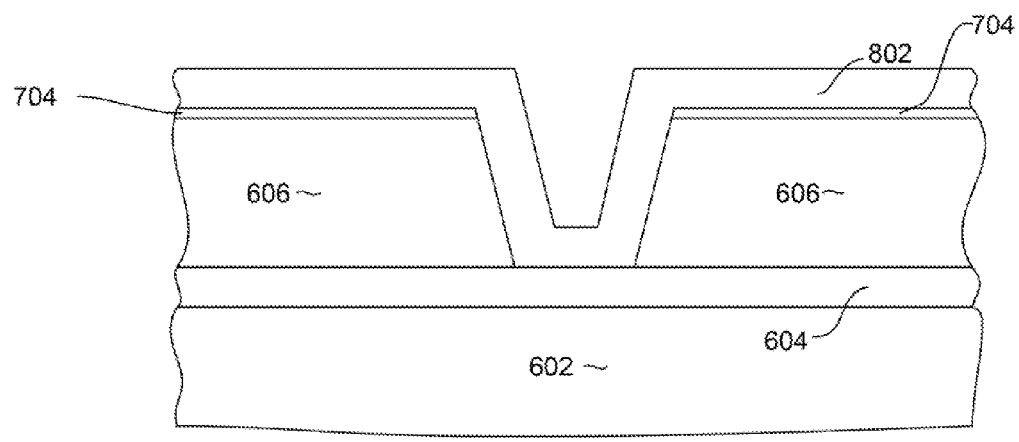
Figure 10:
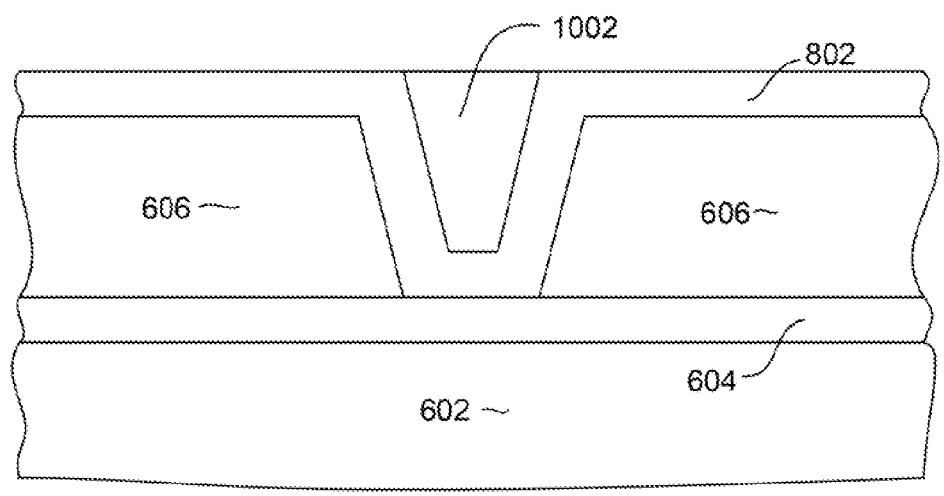

The mask structure 702 can be lifted off, and then a reactive ion etching (RIE) can be performed to remove portions of the fill layer 606 that are not protected by the RIE hard mask 704. The RIE is preferably performed in such a manner to form a trench with tapered side walls in the fill layer 606 as shown in FIG. 8. Then, with reference to FIG. 9 a non-magnetic track width reducing layer 802 can be deposited to reduce the width of the trench formed in the fill layer 606. The track-width reducing layer 802 can be a material such as ALD $Al_2O_3$ or ALD Ru. Then, a magnetic material 1002 can be electroplated, and a chemical mechanical polishing (CMP) can be performed, leaving a structure such as that shown in FIG. 10, with a write pole 1002 formed by the above described damascene process. As can be seen, the write pole is embedded in the track width reducing layer 802, which as mentioned above can be $Al_2O_3$ or Ru.

Figure 11:
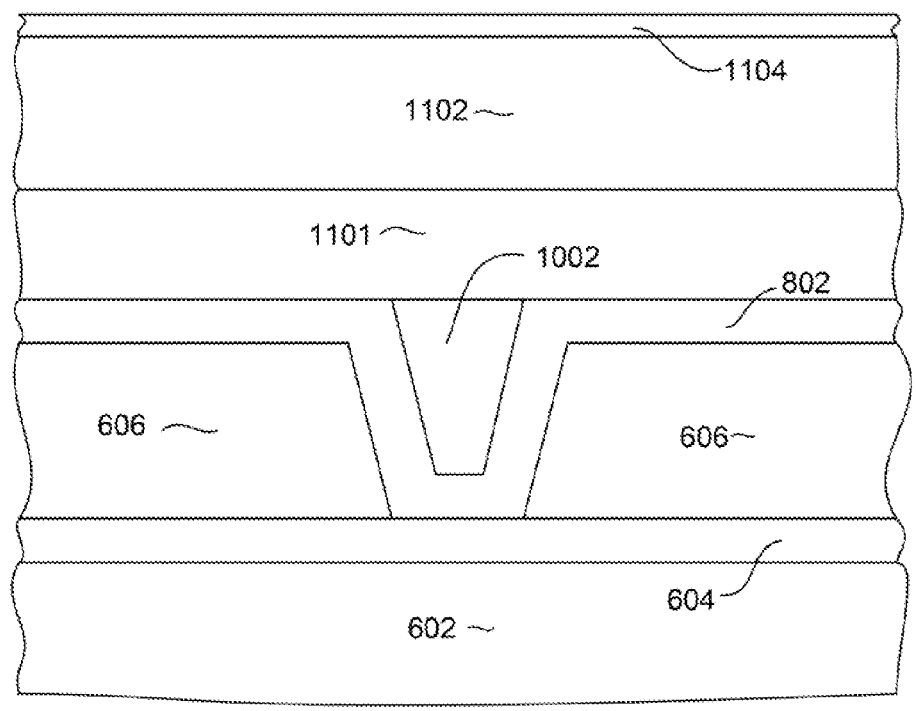

With reference now to FIG. 11, a non-magnetic step layer 1101 is deposited over the write pole 1102 and layers 606 and 802. The non-magnetic step layer 1101 can be a material such as NiCr, Ru or Ir, and can be deposited to a thickness of about 50 to 200 nm. A milling mask layer 1102 constructed of a material such as SiC or $Al_2O_3$ is then deposited over the non-magnetic step layer 1101, and can be deposited to a thickness of about 50 to 300 nm. A thinner RIE hard mask 1104 is then deposited over the milling mask layer 1102. The RIE hard mask layer 1104 can be constructed of a material such as Cr, NiCr and can be deposited to a thickness of about 5 to 100 or about 30 nm.

Figure 12:
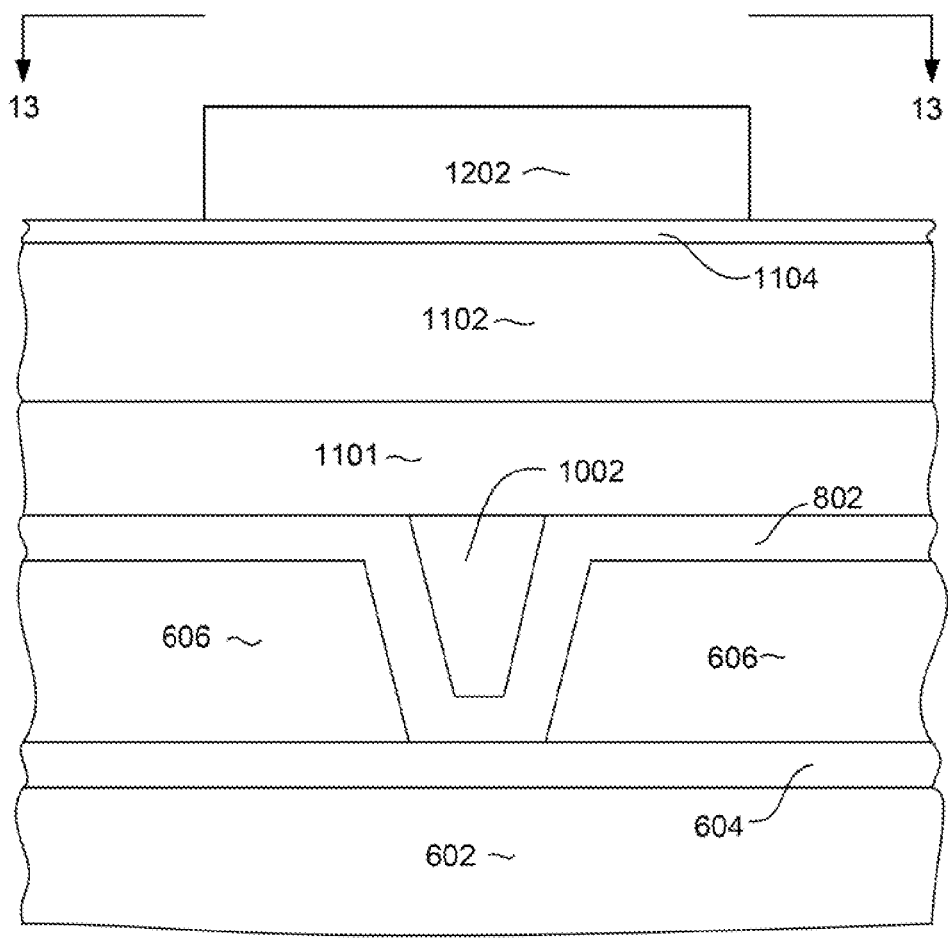
Figure 13:
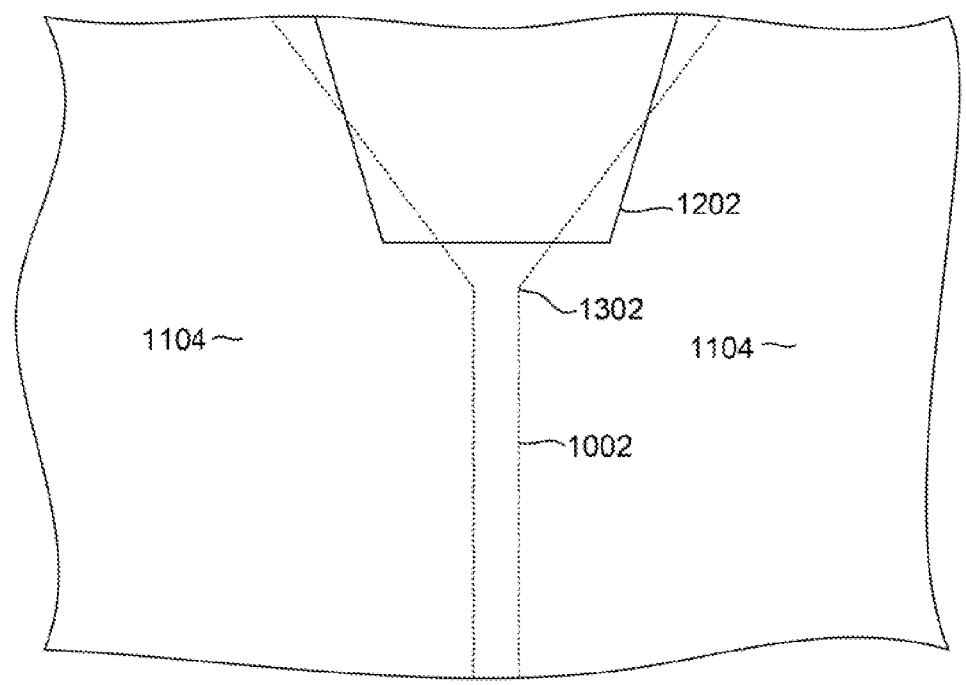

With reference now to FIG. 12, a photoresist mask 1202 is formed over the RIE hard mask 1104. The photoresist mask 1202 is patterned to define a desired step, and its shape can be seen more clearly with reference to FIG. 13, which shows a top down view as shown from lines 13-13 of FIG. 12. In the view of FIG. 13, the write pole 1002 is shown in dashed line to indicate that it is hidden beneath layers 1101, 1102, 1104 (FIG. 12). As shown in FIG. 13, the write pole 1002 has a flare point 1302 and the photoresist layer 1202 has a front edge 1304 that is behind the flare point 1302.

Figure 14:
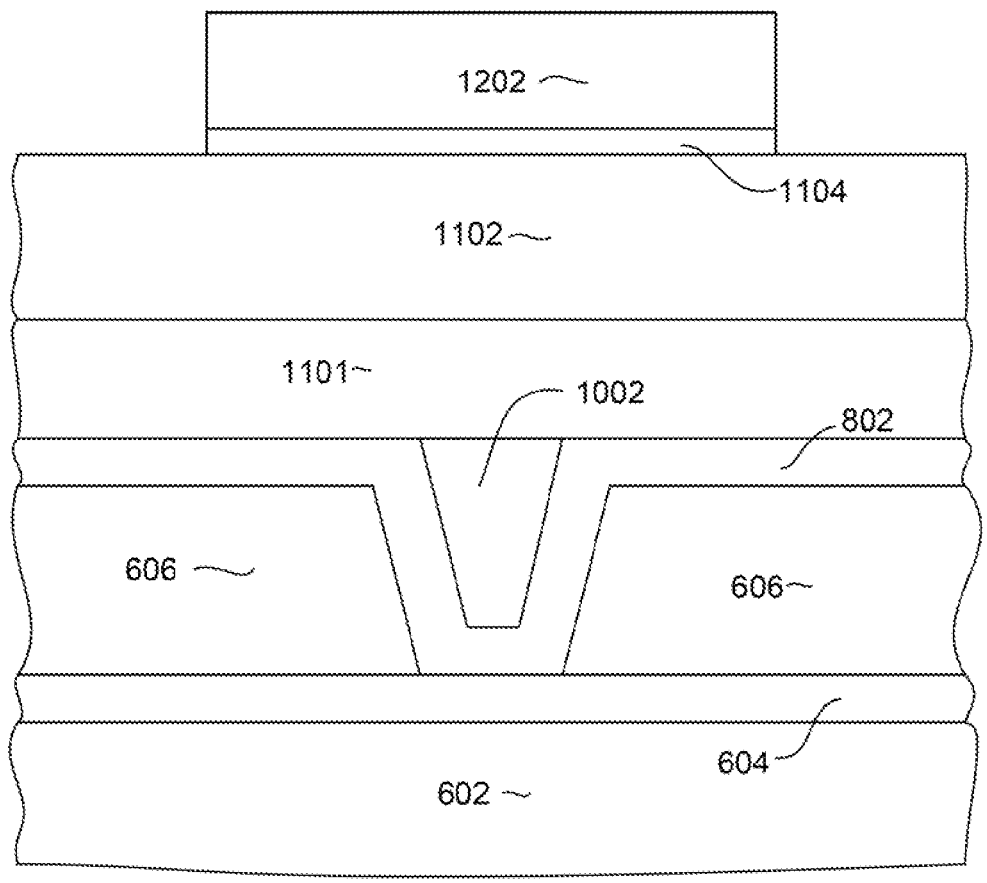
Figure 15:
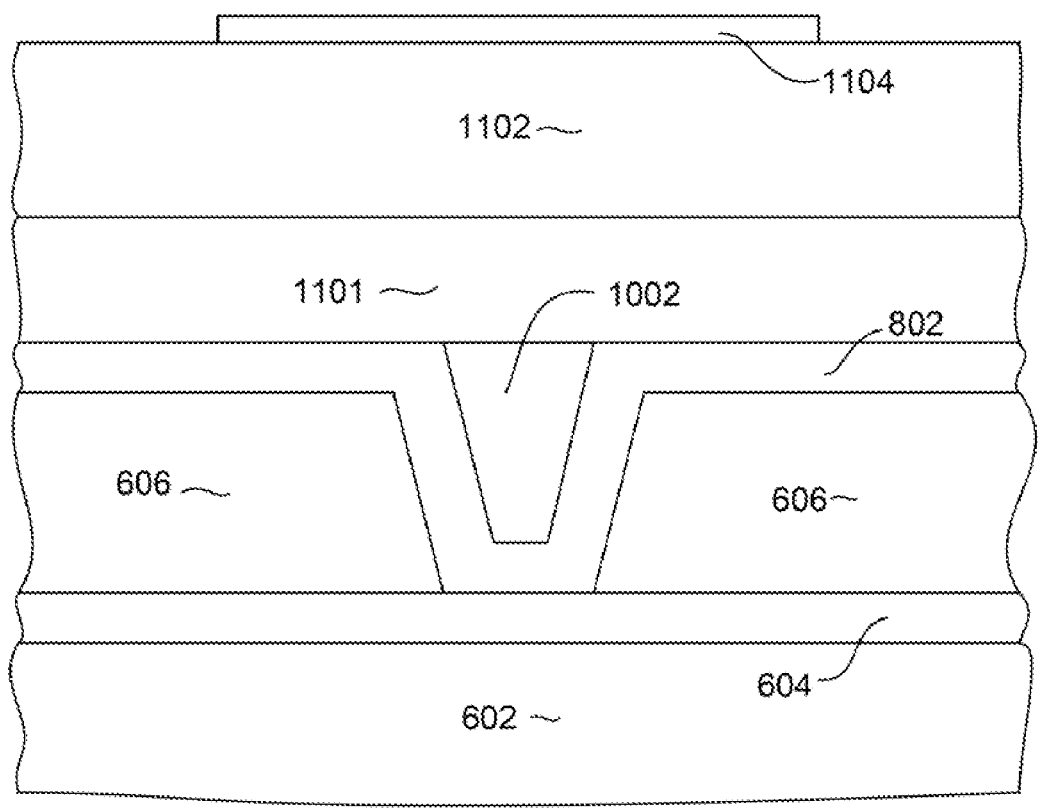
Figure 16:
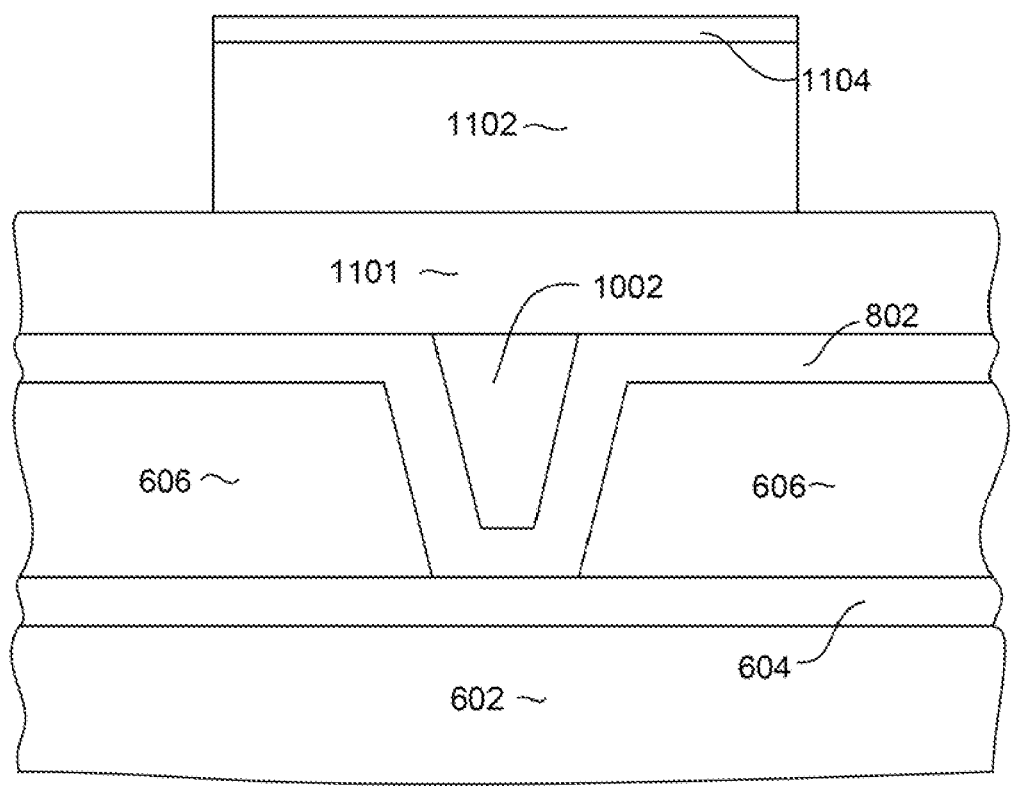

With reference now to FIG. 14, an ion milling is performed to transfer the image of the photoresist layer 1202 onto the underlying hard mask layer 1104. The photoresist layer can then be lifted off, leaving a structure as shown in FIG. 15. Then, a reactive ion etching (RIE) is performed to remove portions of the milling mask layer 1102 that are not protected by the hard mask 1104, leaving a structure as shown in FIG. 16.

Figure 17:
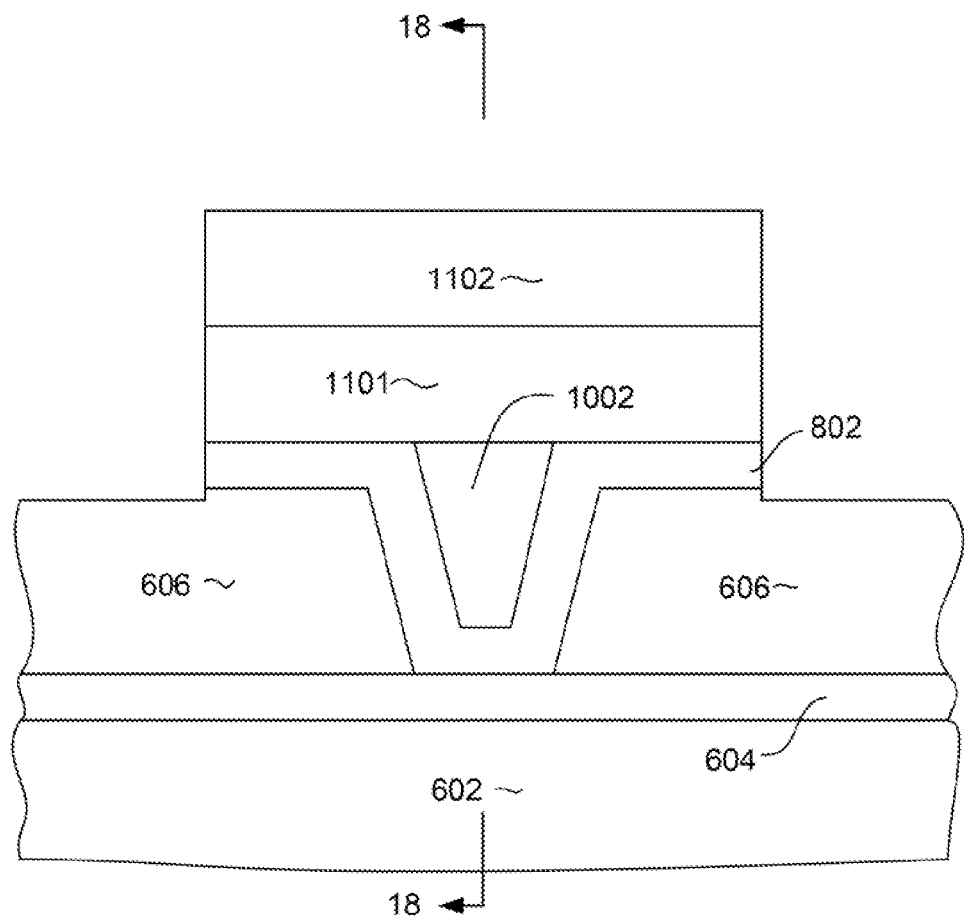
Figure 18:
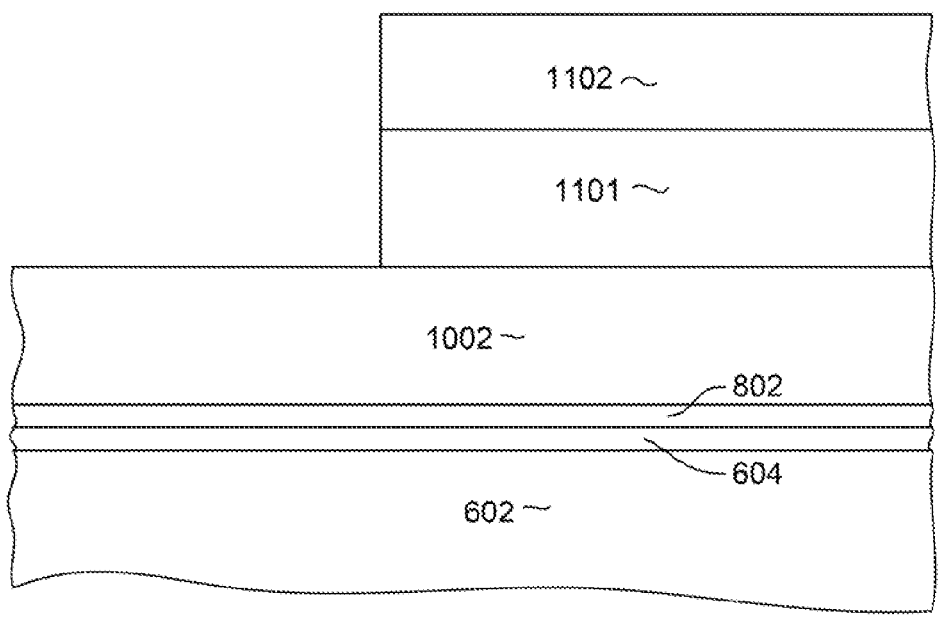

A first ion milling is then performed to remove portions of the step layer 1101, and track width reducing layer 802 that are not protected by the mask layers 1102, 1104, leaving a structure as shown in FIG. 17. This first ion milling is preferably performed at normal or near normal to the plane of the deposited layers, and as can be seen, the first ion milling is terminated when the RIEable fill layer 606 has been reached. FIG. 18, shows a cross sectional view, taken from line 18-18 of FIG. 17.

Figure 19:
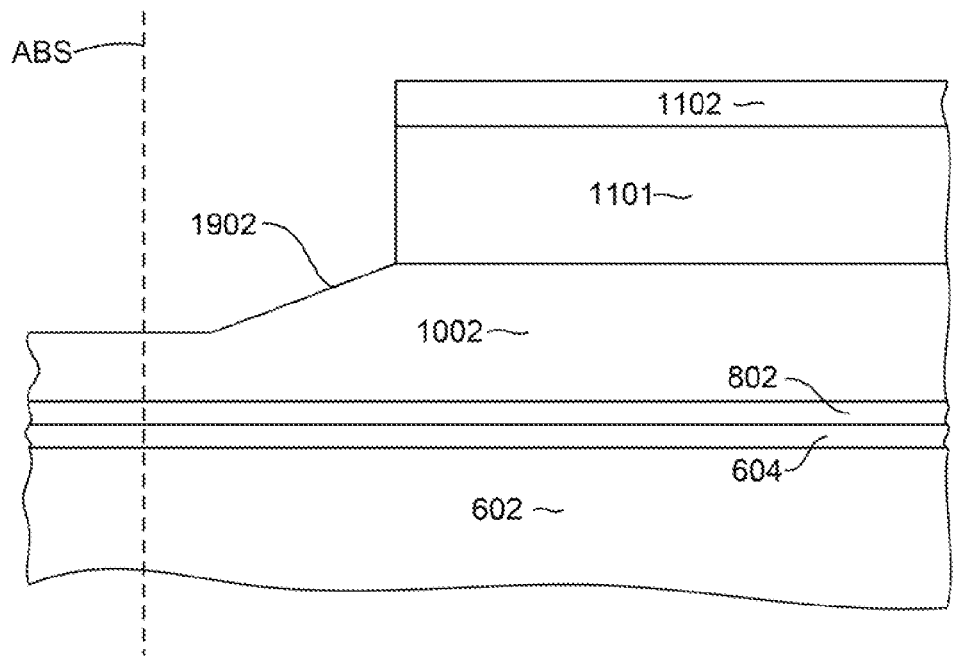

With reference now to FIG. 19, a second ion milling is performed to form a first taper to the trailing edge of the magnetic write pole material 1002. This second ion milling is preferably performed at an angle relative to normal so that shadowing from the layers 1101, 1102 causes the second ion milling to form a tapered surface 1902 on the magnetic write pole layer 1002. The tapered surface 1902 preferably forms and angle 1904 that is 20 to 40 degrees or about 35 degrees relative to horizontal (i.e. relative to the as deposited surface planes of the layers 604, 802, 1102, 1101, 1102. It can be seen, in FIG. 19 that the tapered portion 1902 of the surface of the magnetic write pole layer 1002 terminates short of the air bearing surface, the location of the intended air bearing surface plane being indicated in FIG. 19 by the dashed line denoted as (ABS). This will form a first tapered portion of the write pole layer 1002, a second portion being formed as described herein below. It can also be seen that an additional portion of the mask layer 1102 is consumed by the second ion milling, such that the layer 1102 is thinner in FIG. 19 than it is in FIG. 18.

While the first and second ion milling operations have been described above as separate ion milling operations, in an alternate method, the first and second ion millings can be combined into a single ion milling operation. In this case, the single, combined ion milling would be used both to pattern the image of layer 1102 onto layer 1101, and also to form the tapered surface 1902 on the layer 1002.

Figure 20:
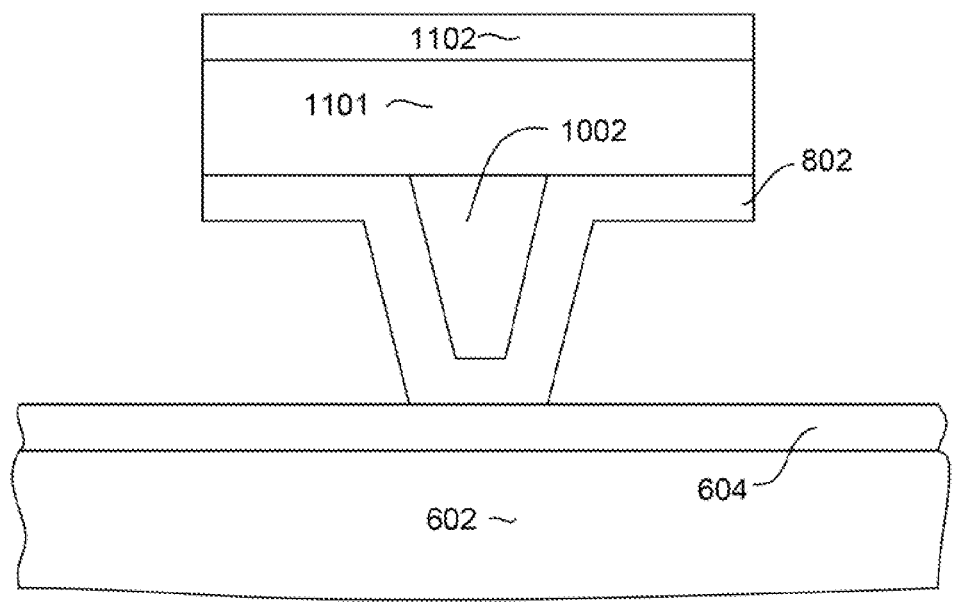
Figure 21:
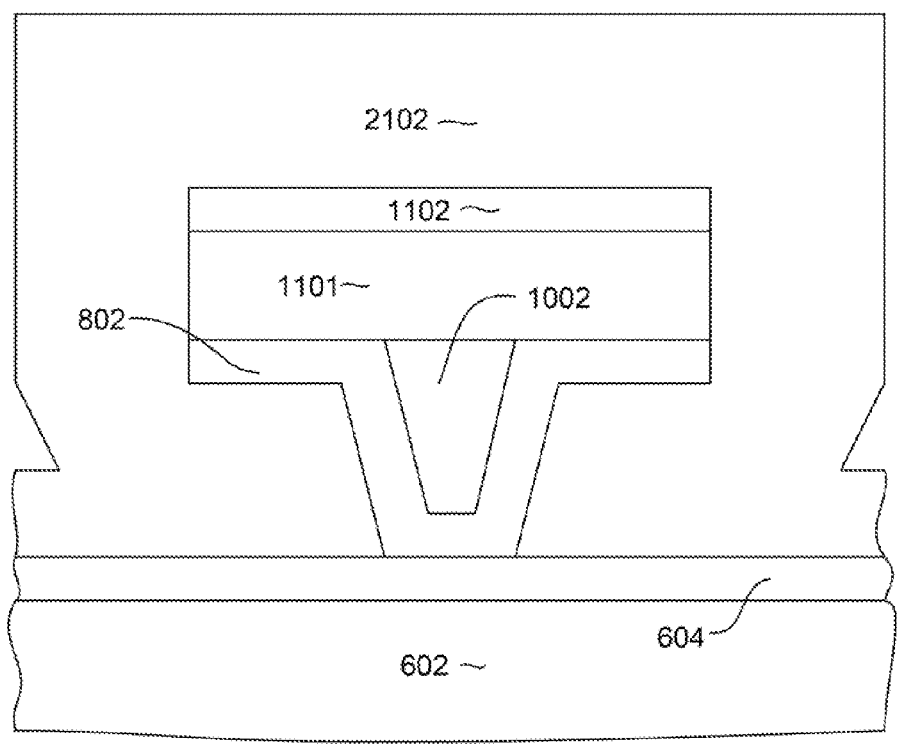

After the second ion milling (or combined first and second ion millings) a reactive ion etching is performed to remove the RIEable fill layer 606 (FIG. 17) leaving a structure such as that shown in FIG. 20, which shows a cross sectional view of a plane parallel with the air bearing surface (ABS). If the fill layer 606 is alumina rather than a material such as $SiO_2$. Then, a wet etch can be used to remove the fill layer 606.

Figure 22:
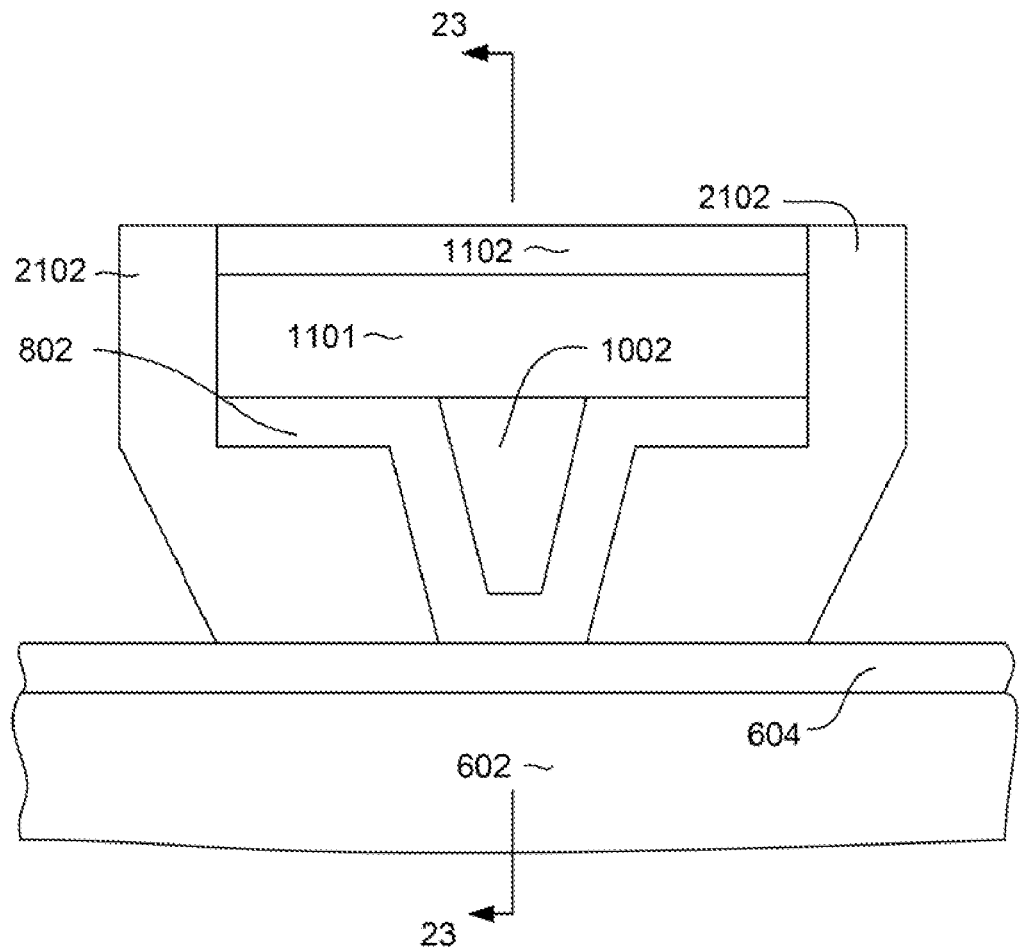
Figure 23:
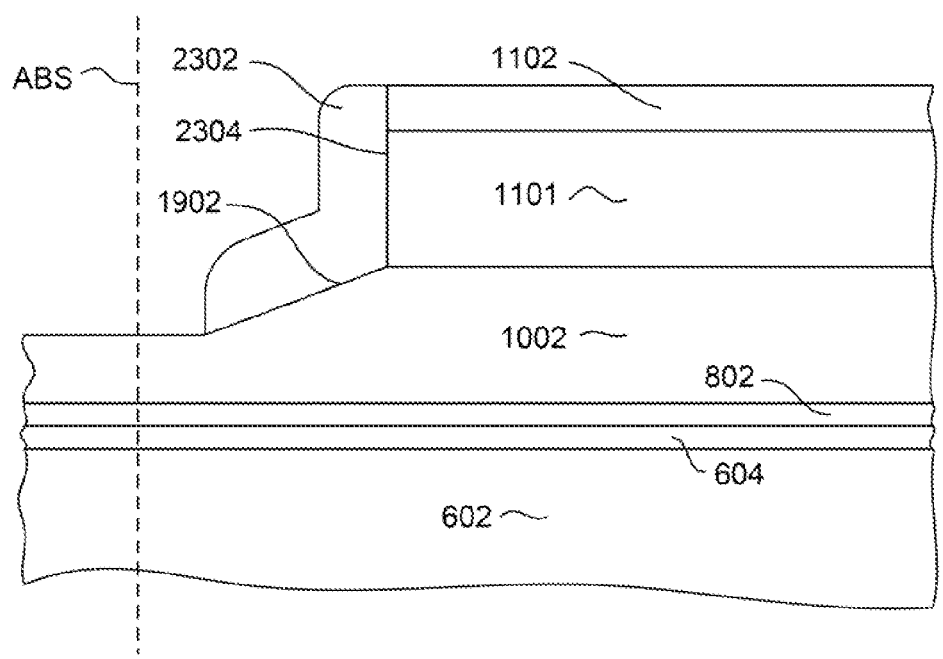
Figure 24:
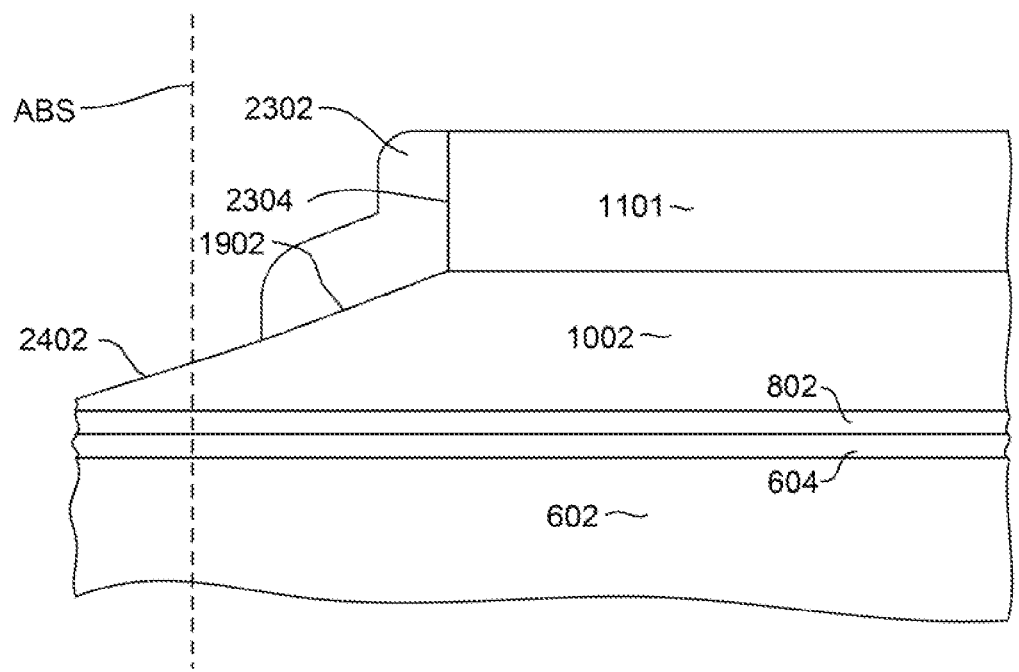

Then, a thick layer of alumina 2102 is deposited by a conformal deposition method such as Atomic Layer Deposition (ALD). This alumina layer 2102 can be deposited to a thickness of about 30 to 150 nm or about 60 nm. Then, a third ion milling (ALD ion milling) is performed to remove a portion of the alumina layer 2102. This ALD ion milling preferentially removes horizontally disposed portions of the alumina layer, leaving alumina side walls 2102 as shown in FIG. 22. This ion milling also leaves an alumina bump layer 2302 as shown in FIG. 23. This alumina bump layer is formed on the front edge 2304 of the layers 1101, 1102. As can be seen, in FIG. 23, the transition from the tapered surface 1902 of layer 1002 to the relatively flat surface 2306 of the layer 1002 occurs before the ABS. That is, the taper 1902 does not extend to the ABS.

Then, yet another ion milling (fourth ion milling or second taper ion milling) is performed to finish forming the taper on the trailing edge of the magnetic write pole layer 1002. It will be recalled that the previously performed ion milling formed the first taper portion 1902. This taper portion 1902 terminated short of the ABS. The non-magnetic, alumina bump layer 2302 now covers this first taper portion 1902. The second ion milling forms a second taper portion 2402 that extends beyond the ABS plane, the alumina bump layer 2302 protecting the first taper portion 1902 during this fourth (second taper) ion milling. This ion milling is preferably performed at an angle and in such a matter as to for the second taper 2402 with an angle of 20-40 degrees or about 35 degrees relative to the surface of the layers 602, 604, 802, 1002, 1101.

Forming the taper portions 1902, 2402 in the above described two step process provides distinct advantages. For example, the location of the front end of the non-magnetic bump can be easily controlled. As will be recalled, the ALD milling process described above that was used to form the non-magnetic bump preferentially removed horizontally disposed portions of the alumina layer 2302. This means that the front edge of the alumina bump 2302 terminated at the front edge of the first taper portion 1902. This allows for accurate control of the front edge of the alumina bump 2302. The above process provides improved process repeatability and control of the location of the front edge of the bump 2302.

Figure 25:
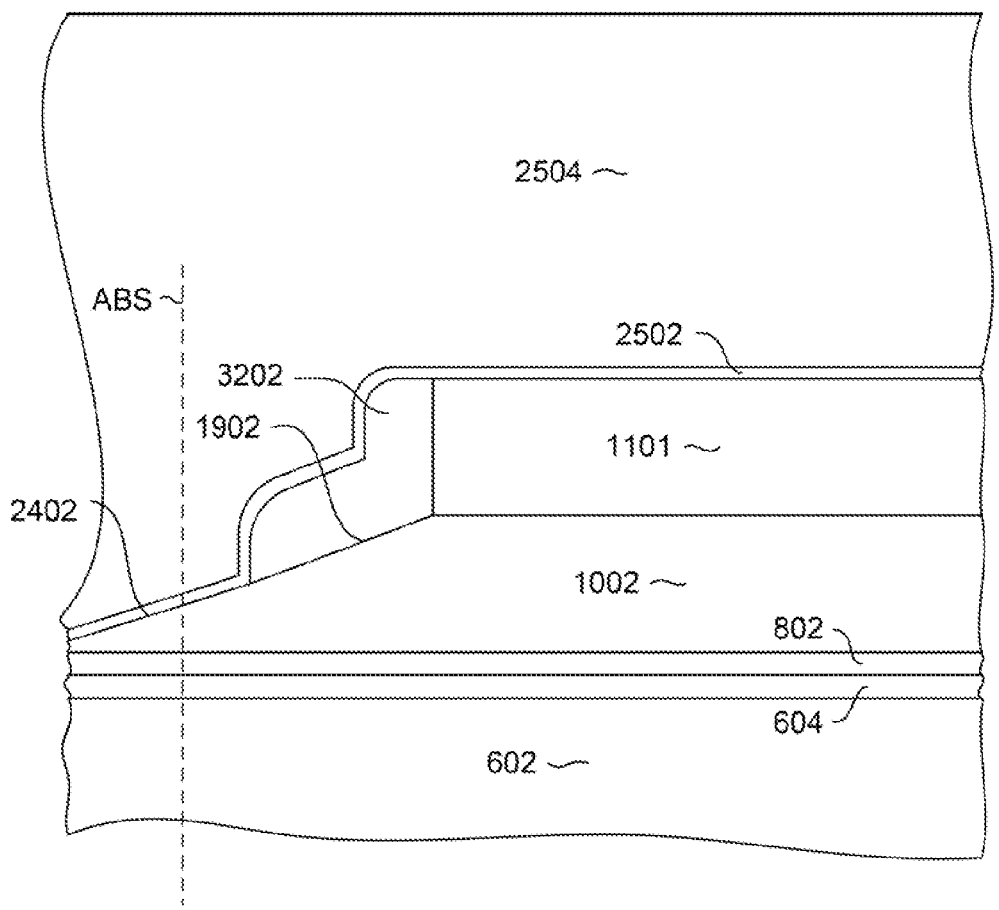

With reference now to FIG. 25, a non-magnetic, electrically insulating layer is deposited. This layer 2502 is deposited. This layer 2502 serves as both a trailing gap layer and an electroplating seed. Therefore, the layer 2502 is deposited to a thickness of a desired trailing gap. Then, an electroplating frame mask (not shown) is formed and a magnetic material 2504 such as CoFe or NiFe is deposited by electroplating to form a wrap-around, trailing magnetic shield, corresponding to the shield 312 of FIGS. 3, 4 and 5.

Figure 26:
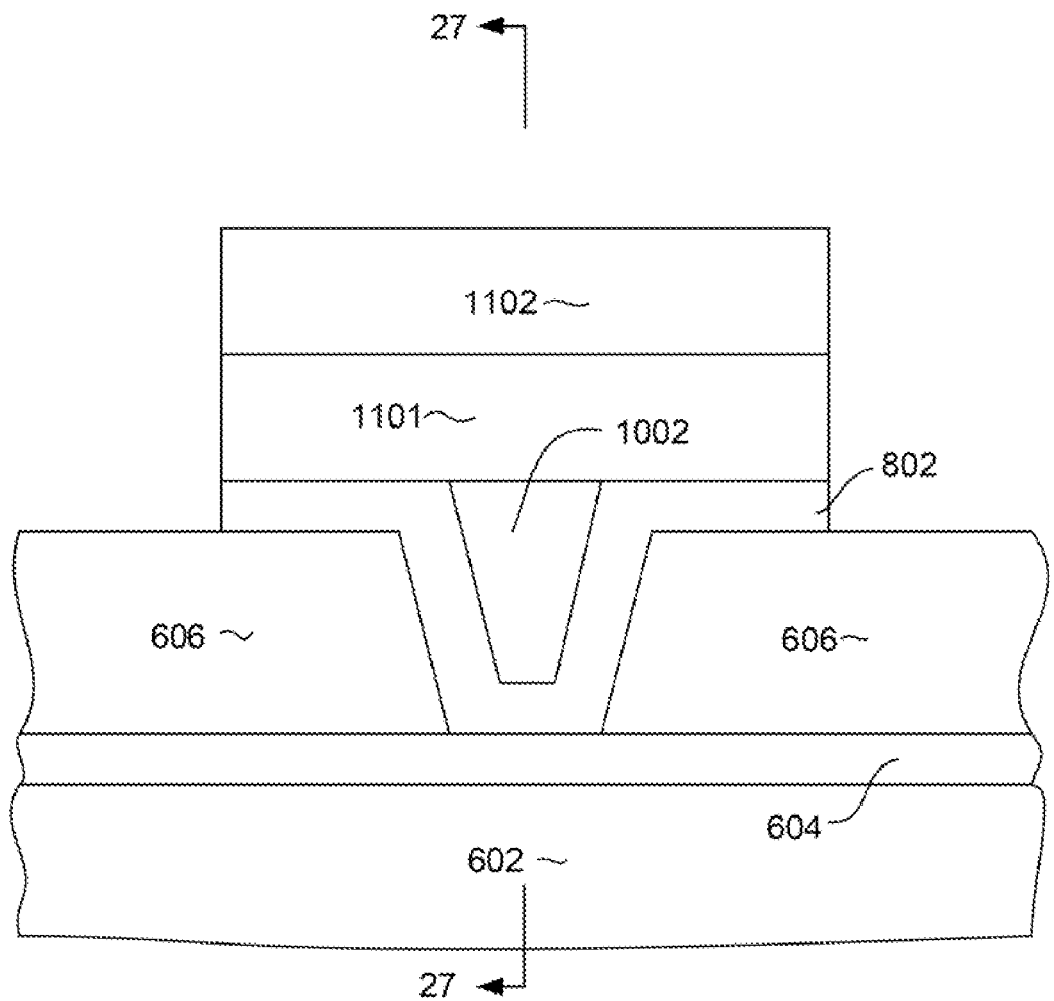
FIGS. 26-32 are views of a portion of a magnetic write head in various intermediate stages of manufacture, illustrating a method for manufacturing a magnetic write head according to an alternate embodiment of the invention.
Figure 27:
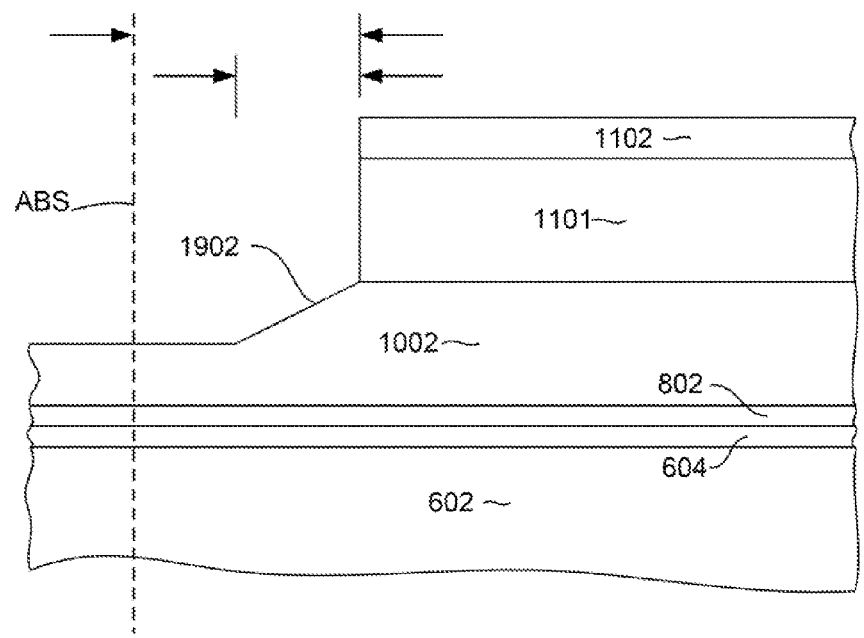

With reference now to FIGS. 26-33 another embodiment for constructing a magnetic head according to an embodiment of the invention is disclosed. FIG. 26 show a structure such as that shown in FIGS. 17 and 18 above. An ion milling process is performed to form a tapered surface 1902 on the write pole 1002, resulting in a structure such as that shown in FIG. 27. The tapered portion 1902 can extend a distance 2702 of 50 to 350 nm from the step layer 1101, and the front edge of the step layer 1101 can extend a distance of 200 to 300 nm from the intended air bearing surface plane (ABS). This means that tapered portion can terminate in front of or behind the ABS plane.

Figure 28:
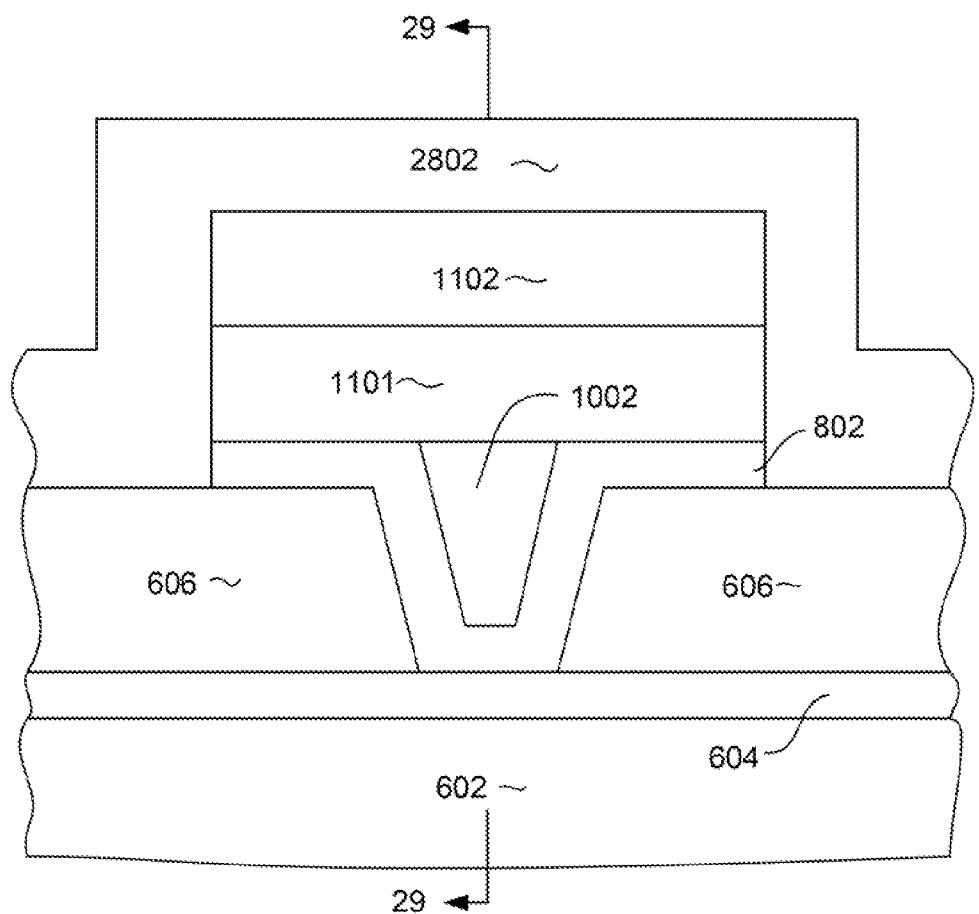
Figure 29:
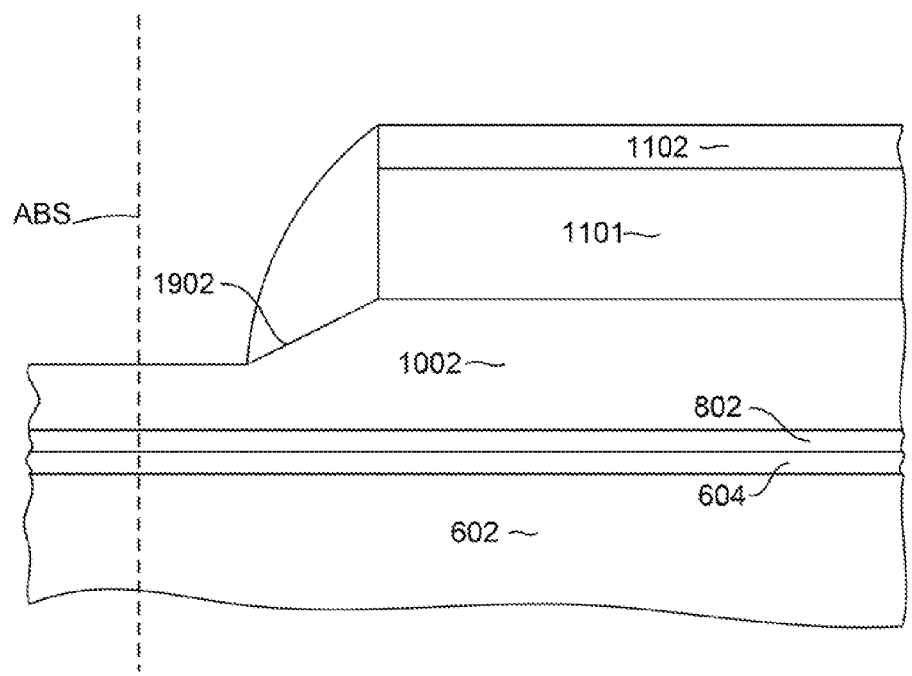
Figure 30:
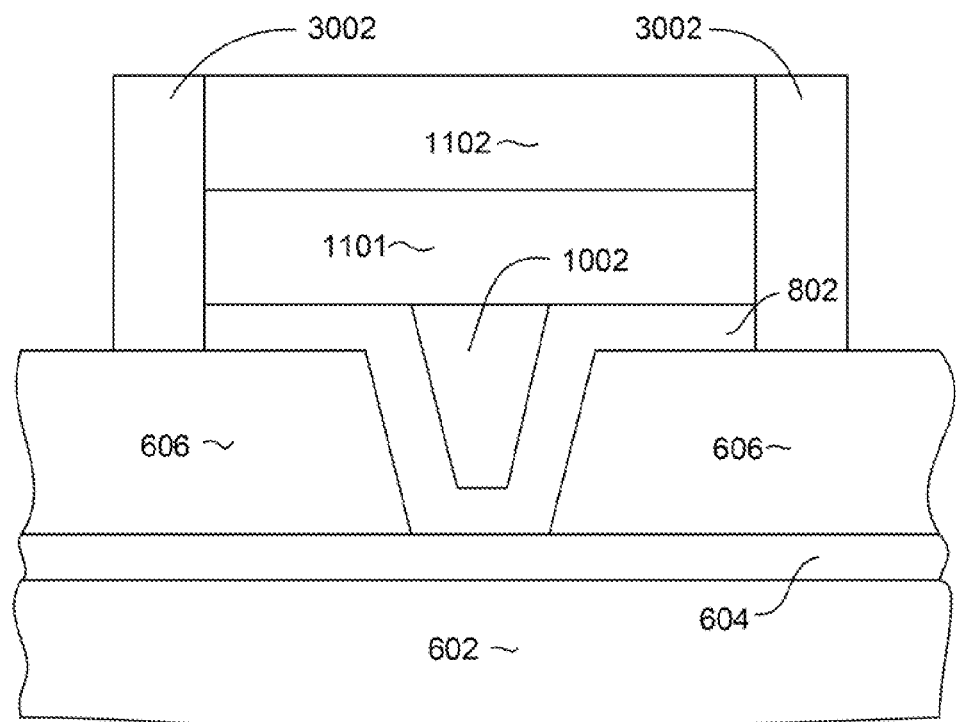

With reference now to FIG. 28, a layer of alumina 2802 is deposited, preferably by atomic layer deposition (ALD). The alumina layer 2802 is preferably deposited to a thickness of 100-200 nm or about 150 nm. Alternatively, the layer 2808 can be some other non-magnetic material such as Ru. An ion milling procedure can then be performed to preferentially remove horizontally disposed portions of the ALD material 2802, leaving a non-magnetic bump structure 2902 as shown in FIG. 29, which is a cross sectional view taken from line 29-29 of FIG. 28, but shown after the ion milling. The non-magnetic bump layer 2902 can extend a distance of 50-150 nm from the front edge of the step layer 1101. This ion milling also leaves ALD side walls 3002 as shown in FIG. 30, FIG. 30 being a view of a plane that is parallel with the ABS. The side walls 3002 are formed of the same ALD layer 2802 deposited above with reference to FIG. 28, as is the bump layer 2902. After the non-magnetic bump 2902 has been formed, another ion milling can be performed to further continue the taper of the trailing edge of the write pole 1002, as described above with reference to FIG. 24.

Figure 31:
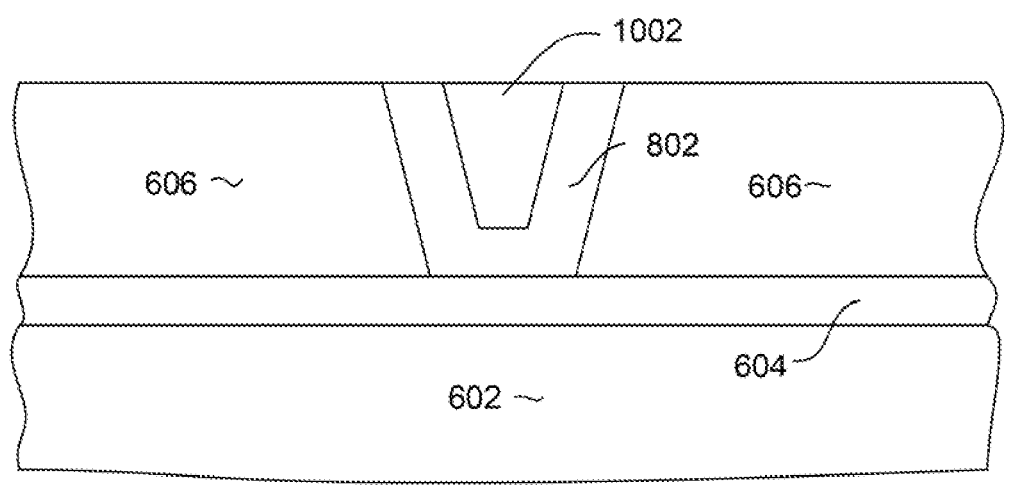

After the bump 2902 and taper 1902 have been formed as shown in FIG. 29, non-magnetic side walls can be formed at the sides of the write pole. The Ru layer 802 provides some side wall gap, but generally a larger gap will be desired. FIG. 31 shows a view of the structure so far as viewed from a plane parallel with and near the ABS plane. The step structures 1101, 1102 (FIG. 30) are not shown in FIG. 31, because those structures are located further back away from the ABS. As can be seen, in FIG. 31, the fill layer 606 still remains. This fill layer 606 can be alumina ($Al_2O_3$) or can be $SiO_2$. At least a couple of methods are available for removing this till material and leaving a non-magnetic side wall. A remaining portion of the fill layer 606 can be used to provide the added non-magnetic side wall gap.

Figure 32:
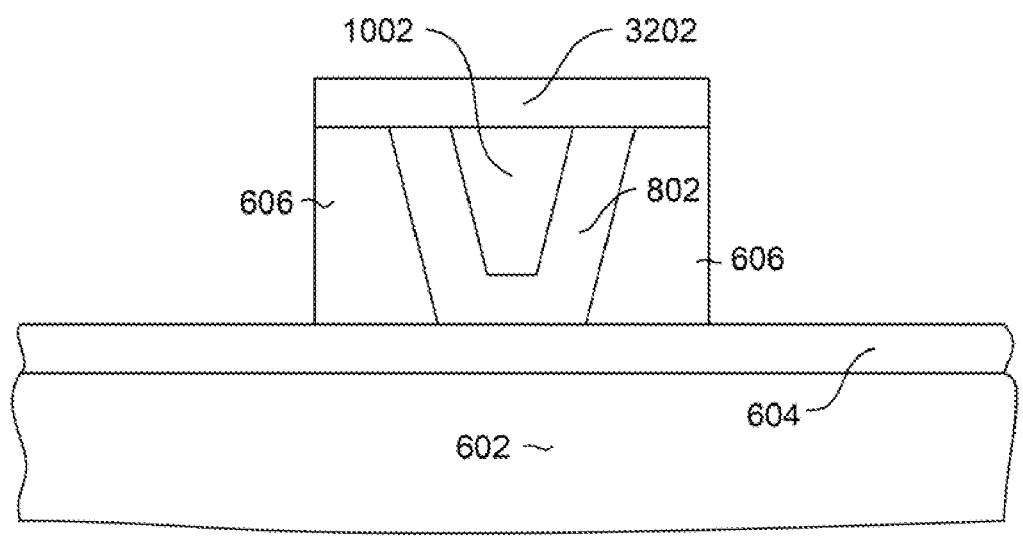

With reference to FIG. 32, a mask structure 3202 is formed over the write pole structure 1002. A reactive ion etching can be performed to remove portions of the fill layer 606 that are not protected by the mask 3202. Therefore, the mask 3202 defines the width of the side gap. After forming the bump and side gap layers as described above, a trailing gap and trailing shield can be formed as described above with reference to FIG. 25.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   forming a magnetic write pole;
   depositing a non-magnetic step layer over the write pole the non-magnetic step layer having front edge located a desired distance from an intended air bearing surface plane;
   performing a first ion milling to form a first tapered portion on the write pole;
   depositing a non-magnetic material;
   performing a second ion milling to preferentially remove horizontally disposed portions of the non-magnetic material, leaving a non-magnetic bump over the front edge of the non-magnetic step layer; and
   performing a third ion milling to form a second tapered portion on the write pole.

2. The method as in claim 1 wherein the first and third ion millings are performed so as to form the first and second tapered portions each with an angle of 20-40 degrees with respect to a non-tapered portion of the write pole.

3. The method as in claim 1 wherein the first tapered portion terminates short of the intended air bearing surface plane and the second tapered portion extends beyond the intended air bearing surface plane.

4. The method as in claim 1 wherein the non-magnetic step layer comprises NiCr, Cr, Ru.

5. The method as in claim 1 further comprising, after performing the third ion milling, depositing an electrically conductive, non-magnetic gap layer to a thickness to define a trailing gap, and then electroplating a magnetic shield over the electrically conductive non-magnetic gap layer.

6. The method as in claim 1 wherein the first and third ion millings are each performed at an angle relative to normal, so that shadowing from the non-magnetic step layer forms the first and second tapered portions.

7. The method as in claim 1 wherein the magnetic write pole is formed by a damascene process.

8. The method as in claim 1 wherein the write pole is embedded in a layer of Ru.

9. A method for manufacturing a magnetic write head, comprising:
   providing a substrate;
   depositing a non-magnetic RIEable material;
   forming an opening in the RIEable material;
   depositing a non-magnetic track width reducing layer into the opening;
   depositing a magnetic write pole material;
   depositing a non-magnetic step material;
   forming a mask structure over the non-magnetic step layer, the mask having a front edge;
   performing a material removal process to transfer the image of the mask structure onto the underlying non-magnetic step layer, leaving a front edge on the non-magnetic step layer;
   performing a first ion milling to form a first tapered portion on the magnetic write pole material;
   removing the non-magnetic RIEable material;
   conformally depositing a layer of non-magnetic material;
   performing a second ion milling to preferentially remove horizontally disposed portions of the alumina layer, leaving an alumina bump at the front edge of the non-magnetic step layer; and
   performing a third ion milling to form second tapered portion on the magnetic write pole material.

10. The method as in claim 9 wherein the first and third ion millings are performed at an angle relative to normal such that shadowing from the non-magnetic step layer forms first and second tapered portions.

11. The method as in claim 9 wherein the first tapered portion terminates short of an intended air bearing surface plane and the second tapered portion extends beyond the intended air bearing surface plane.

12. The method as in claim 9 wherein the RIEable fill layer comprises $SiO_2$ and the removing the RIEable fill layer comprises performing a reactive ion etching.

13. The method as in claim 9 wherein the RIEable fill layer comprises alumina and wherein the removing the RIEable fill layer comprises a wet etch.

14. The method as in claim 9 wherein the track width reducing layer comprises Ru.

15. The method as in claim 9 wherein the alumina layer is deposited by atomic layer deposition.

16. The method as in claim 9 wherein the first and second tapered portions each form an angle of 30-40 degrees relative to a surface of the as deposited magnetic write pole material.

17. The method as in claim 9 wherein the second tapered portion initiates at the alumina bump and extends beyond an intended air bearing surface plane.

18. The method as in claim 9 wherein the non-magnetic step layer comprises NiCr.

19. The method as in claim 9 wherein the forming the mask structure over the non-magnetic step layer further comprises:
- depositing an ion milling mask layer over the non-magnetic step layer;
- depositing a RIE hard mask over the ion milling mask layer and forming a photoresist mask over the REI hard mask layer;
- performing an ion milling to transfer the image of the photoresist mask onto the underlying RIE hard mask layer; and
- performing a reactive ion etching to transfer the image of the RIE hard mask onto the underlying ion milling mask layer.

20. The method as in claim 19 wherein the ion milling mask layer comprises SiC or alumina and the RIE hard mask comprises Cr.

21. The method as in claim 9 further comprising, after performing the third ion milling, depositing a thin, non-magnetic trailing gap layer and forming wrap-around trailing magnetic shield over the non-magnetic trailing gap layer.

22. The method as in claim 9 wherein the RIEable fill material is removed prior to conformally depositing the non-magnetic material.

23. The method as in claim 9 wherein the RIEable fill material is removed after the second ion milling.

* * * * *